US012633593B2

(12) United States Patent

Hwang

(10) Patent No.: US 12,633,593 B2

(45) Date of Patent: May 19, 2026

(54) BATTERY MODULE, AND BATTERY PACK AND VEHICLE INCLUDING THE SAME

(71) Applicant: LG Energy Solution, Ltd., Seoul (KR)

(72) Inventor: Sung-Tack Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 499 days.

(21) Appl. No.: 18/037,368

(22) PCT Filed: Jan. 10, 2022

(86) PCT No.: PCT/KR2022/000399

§ 371 (c)(1),
(2) Date: May 17, 2023

(87) PCT Pub. No.: WO2022/270705

PCT Pub. Date: Dec. 29, 2022

(65) Prior Publication Data

US 2023/0420770 A1 Dec. 28, 2023

(30) Foreign Application Priority Data

Jun. 21, 2021 (KR) ........................ 10-2021-0080409

(51) Int. Cl.
| | |
|---|---|
| *H01M 10/6556* | (2014.01) |
| *B60L 50/64* | (2019.01) |
| *H01M 10/613* | (2014.01) |
| *H01M 10/625* | (2014.01) |

(Continued)

(52) U.S. Cl.
CPC ......... *H01M 10/6556* (2015.04); *B60L 50/64* (2019.02); *H01M 10/613* (2015.04); *H01M 10/625* (2015.04); *H01M 50/211* (2021.01);

*H01M 50/249* (2021.01); *H01M 50/271* (2021.01); *H01M 2220/20* (2013.01)

(58) Field of Classification Search
CPC .................................................. H01M 10/6556
See application file for complete search history.

(56) References Cited

U.S. PATENT DOCUMENTS

| | | | |
|---|---|---|---|
| 2012/0138274 | A1 | 6/2012 | Shin et al. |
| 2012/0315529 | A1 | 12/2012 | Jin |

(Continued)

FOREIGN PATENT DOCUMENTS

| | | | |
|---|---|---|---|
| CN | 208507895 U | 2/2019 | |
| CN | 110635193 A | 12/2019 | |

(Continued)

OTHER PUBLICATIONS

International Search Report for Application No. PCT/KR2022/000399 mailed Apr. 19, 2022, pp. 1-3.

(Continued)

*Primary Examiner* — Brian R Ohara
(74) *Attorney, Agent, or Firm* — Lerner David LLP

(57) ABSTRACT

A battery module according to an embodiment of the present disclosure includes a plurality of battery cells; a case configured to accommodate the plurality of battery cells; a cover coupled to the case; a cooling pipe disposed between the case and the cover to cool the plurality of battery cells; and a support structure that supports the cooling pipe and is variably provided to correspond to the shape of the cooling pipe. A battery pack and a vehicle may include the battery module.

11 Claims, 6 Drawing Sheets

(51) Int. Cl.
    *H01M 50/211*        (2021.01)
    *H01M 50/249*        (2021.01)
    *H01M 50/271*        (2021.01)

(56)         References Cited

U.S. PATENT DOCUMENTS

| | | | |
|---|---|---|---|
| 2017/0303445 A1 | 10/2017 | Robert et al. | |
| 2019/0334216 A1* | 10/2019 | Kim | H01M 10/486 |
| 2020/0161729 A1 | 5/2020 | Kim et al. | |
| 2020/0220128 A1 | 7/2020 | Kim et al. | |
| 2021/0175572 A1* | 6/2021 | He | H01M 10/613 |

FOREIGN PATENT DOCUMENTS

| | | |
|---|---|---|
| CN | 210778713 U | 6/2020 |
| CN | 111403831 A | 7/2020 |
| JP | 2010040420 A | 2/2010 |
| KR | 200411119 Y1 | 3/2006 |
| KR | 101209686 B1 | 12/2012 |
| KR | 20130008142 A | 1/2013 |
| KR | 101261736 B1 | 5/2013 |
| KR | 20180133728 A | 12/2018 |
| KR | 20180133729 A | 12/2018 |
| KR | 20190036379 A | 4/2019 |
| KR | 20190064835 A | 6/2019 |
| KR | 20190069044 A | 6/2019 |
| KR | 102073853 B1 | 2/2020 |

OTHER PUBLICATIONS

Extended European Search Report including Written Opinion for Application No. 22828558.1 dated Jul. 1, 2024. 10 pgs.

* cited by examiner

BATTERY MODULE, AND BATTERY PACK AND VEHICLE INCLUDING THE SAME

CROSS-REFERENCE TO RELATED APPLICATIONS

The present application is a national phase entry under 35 U.S.C. § 371 of International Application No. PCT/KR2022/000399 filed Jan. 10, 2022, which claims the benefit of Korean Patent Application No. 10-2021-0080409 filed on Jun. 21, 2021 with the Korean Intellectual Property Office, the entire contents of which are incorporated herein by reference.

TECHNICAL FIELD

The present disclosure relates to a battery module, a battery pack, and a vehicle including the same, and more specifically, to a battery module provided with a variable support structure of a cooling pipe, and a battery pack and a vehicle including the same.

BACKGROUND ART

As technology development and demand for mobile devices increases, the demand for secondary batteries as an energy source rapidly increases. In the related art, nickel cadmium batteries or hydrogen ion batteries have been used as secondary batteries. Recently, lithium secondary batteries which have almost no memory effect compared to nickel-based secondary batteries, which results in free charge/discharge, very low self-discharge rate, and high energy density, have been widely used.

Such a lithium secondary battery mainly uses a lithium-based oxide and a carbon material as a positive electrode active material and a negative electrode active material, respectively. The lithium secondary battery includes an electrode assembly in which a positive electrode plate and a negative electrode plate coated with the positive electrode active material and the negative electrode active material, respectively, are disposed with a separator interposed therebetween, and a casing, such as a battery case, for sealing and accommodating the electrode assembly along with an electrolyte.

The lithium secondary battery includes a positive electrode, a negative electrode, a separator interposed therebetween, and an electrolyte, and is classified into a lithium-ion battery (LIB), a polymer lithium-ion battery (PLM), and the like depending on which positive electrode and negative electrode active materials are used. In general, the electrodes of known lithium secondary batteries may be formed by coating a positive electrode or negative electrode active material on a current collector such as an aluminum or copper sheet, mesh, film, foil, or the like, and then allowing the active material to dry. Additionally, various types of secondary batteries include a case capable of protecting battery cells, a battery module in which a plurality of battery cells are stacked to be inserted into the case, and a battery pack including a plurality of battery modules.

A cooling pipe through which water or air moves to cool the battery cells may be installed in the battery module.

Battery cells may be stacked or accommodated in the case in various ways. Because there is a difference of heat generation according to a stacking method or an accommodating method of the battery cells, the shape of the cooling pipe may also be changed.

In the related art, when the shape of the cooling pipe is changed due to the change in arrangement of the battery cells, a structure supporting the cooling pipe should be individually provided for each shape of the cooling pipe according to the arrangement of the battery cells, thereby increasing the cost of the overall system.

In addition, electrical equipment may be provided in the battery module. Although heat is generated in the electrical equipment, a cooling device is either not provided or cooling is performed simply by using a cooling fan, thereby causing a low cooling efficiency.

DISCLOSURE

Technical Problem

The present disclosure is designed to solve the problems of the related art, and therefore the present disclosure is directed to providing a battery module having a variable support structure to support the cooling pipe as the shape of the cooling pipe is changed, and a battery pack and a vehicle including the same.

Technical Solution

In one aspect of the present disclosure, there is provided a battery module including a plurality of battery cells; a case configured to accommodate the plurality of battery cells; a cover coupled to the case; a cooling pipe disposed between the case and the cover to cool the plurality of battery cells; and a support structure that supports the cooling pipe and is variably provided to correspond to the shape of the cooling pipe.

In addition, a plurality of receiving grooves are formed in the cover, and the support structure may include a plurality of support blocks in which protrusions are formed to be respectively coupled to the plurality of receiving grooves.

Also, the plurality of receiving grooves may be arranged in a predetermined shape, the plurality of support blocks may be coupled to at least a portion of the plurality of receiving grooves to form a flow path, and the cooling pipe may be inserted into the flow path.

In addition, the plurality of support blocks may be provided to be in contact with the cooling pipe to support the cooling pipe, when the cooling pipe is inserted into the flow path.

Also, the flow path may be variably provided according to the number and position of the plurality of support blocks coupled to the plurality of receiving grooves.

Meanwhile, in another aspect of the present disclosure, there is provided a battery module including a plurality of battery cells; a case configured to accommodate the plurality of battery cells; an electrical member coupled to the case; a cooling pipe disposed in the electrical member to cool the electrical member; and a support structure that supports the cooling pipe and is variably provided to correspond to the shape of the cooling pipe.

In addition, the electrical member may include an electrical case to accommodate electrical equipment; and an electrical cover coupled to the electrical case, and the cooling pipe may be disposed between the electrical case and the electrical cover to cool the electrical equipment.

Also, a plurality of receiving grooves are formed in the electrical cover, and the support structure may include a plurality of support blocks in which protrusions are formed to be respectively coupled to the plurality of receiving grooves.

In addition, the plurality of receiving grooves may be arranged in a predetermined shape, the plurality of support blocks may be coupled to at least a portion of the plurality of receiving grooves to form a flow path, and the cooling pipe may be inserted into the flow path.

Also, the plurality of support blocks may be provided to be in contact with the cooling pipe to support the cooling pipe, when the cooling pipe is inserted into the flow path.

In addition, the flow path may be variably provided according to the number and position of the plurality of support blocks coupled to the plurality of receiving grooves.

Meanwhile, in another aspect of the present disclosure, there is provided a battery pack including the battery module. And, there is also provided a vehicle including the battery module.

Advantageous Effects

According to embodiments of the present disclosure, a support structure is provided to support cooling pipes even if the shape of the cooling pipes is changed, which reduces the overall system cost.

DESCRIPTION OF DRAWINGS

FIG. 7 is another perspective view of support blocks in the battery module of FIG. 1 having various shapes.

DETAILED DESCRIPTION OF THE PREFERRED EMBODIMENTS

Figure 1:
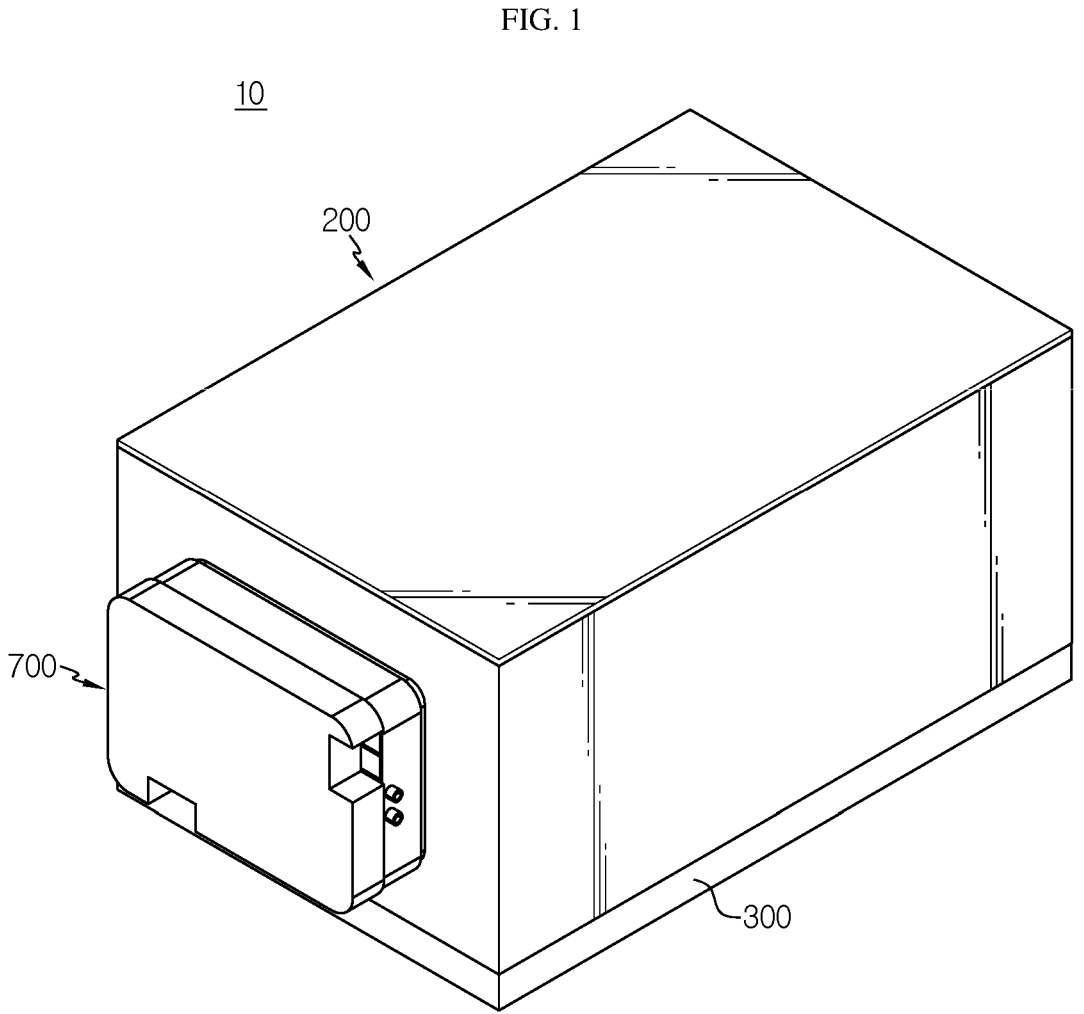
FIG. 1 is perspective view of a battery module according to one embodiment of the present disclosure.

Hereinafter, preferred embodiments of the present disclosure will be described in detail with reference to the accompanying drawings. It should be understood that the terms used in the specification and the appended claims should not be construed as limited to general and dictionary meanings, but interpreted based on the meanings and concepts corresponding to technical aspects of the present disclosure on the principle that the inventor is allowed to define terms appropriately for the best explanation. Therefore, the description proposed herein is a preferable example for the purpose of illustrations only, and is not intended to limit the scope of the disclosure, so it should be understood that other equivalents and modifications could be made thereto without departing from the scope of the disclosure.

In the drawings, the size of each component or a specific portion constituting the component may be exaggerated, omitted, or schematically illustrated for convenience and clarity of description. Therefore, the size of each component does not fully reflect the actual size. When it is determined that a detailed description of a related known function or configuration may unnecessarily obscure the gist of the present disclosure, such description will be omitted.

As used herein, the term 'coupled' or 'connected' refers not only to a case in which one member and another member are directly coupled or directly connected, but also a case in which one member is indirectly coupled or indirectly connected to another member through a joint member.

Figure 2:
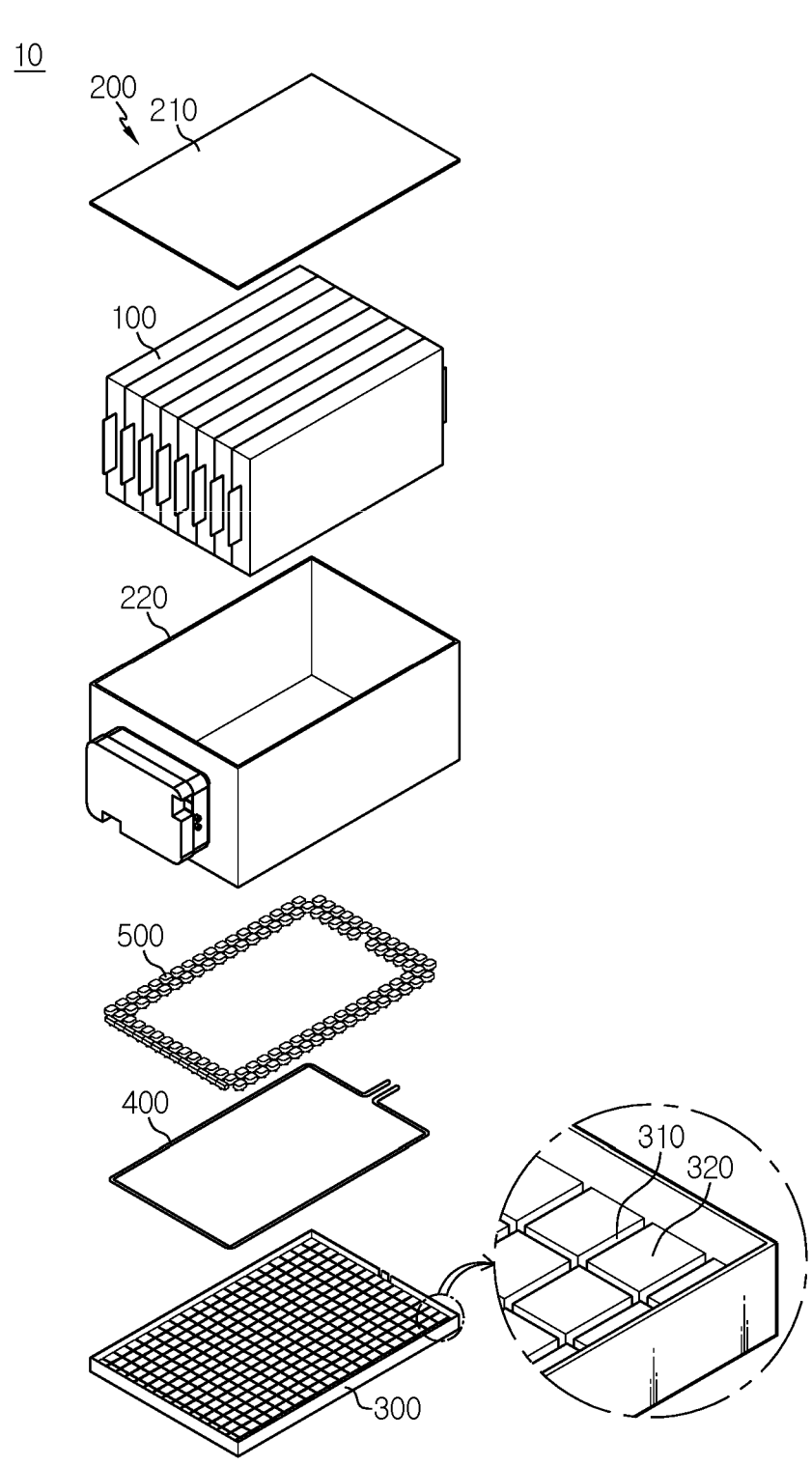
FIG. 2 is an exploded perspective view of the module of FIG. 1.
Figure 3:
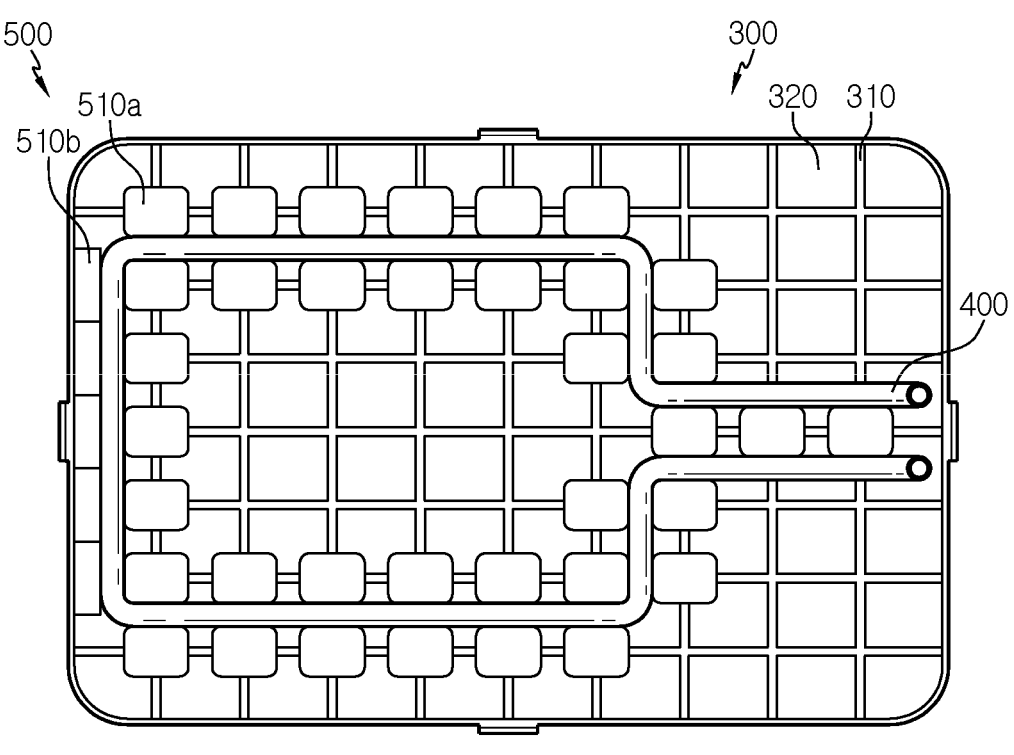
FIG. 3 is a top view of a cooling pipe disposed on a cover and supported by support blocks in the battery module according to the embodiment of FIG. 1.
Figure 4:
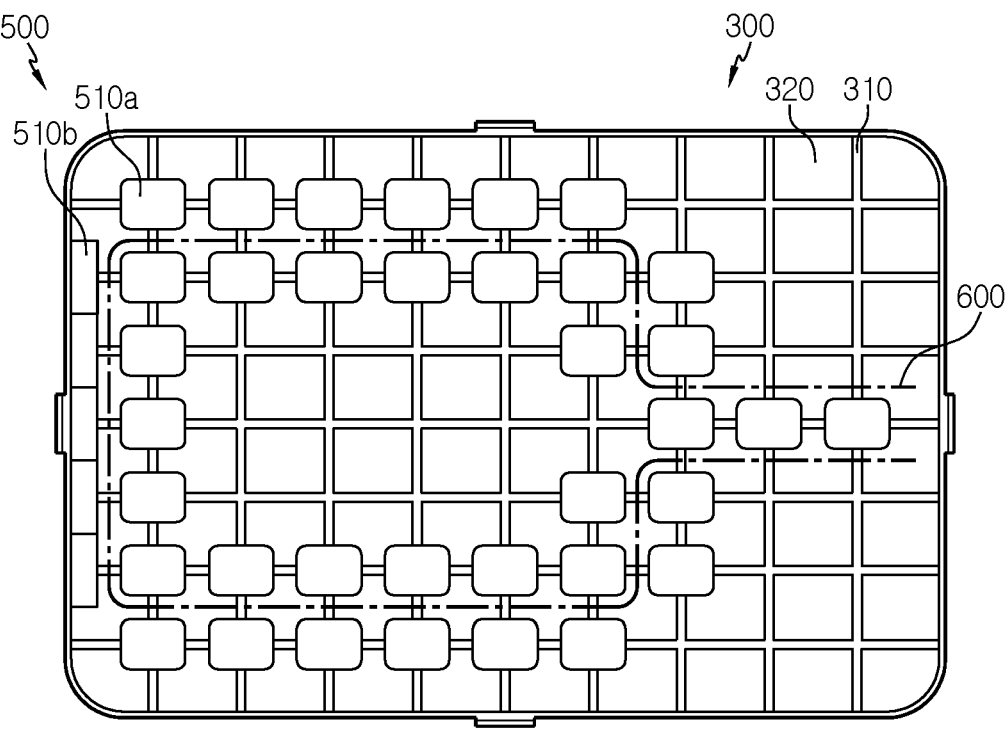
FIG. 4 is a top view of the cover of FIG. 3 in which the cooling pipe is removed.
Figure 5:
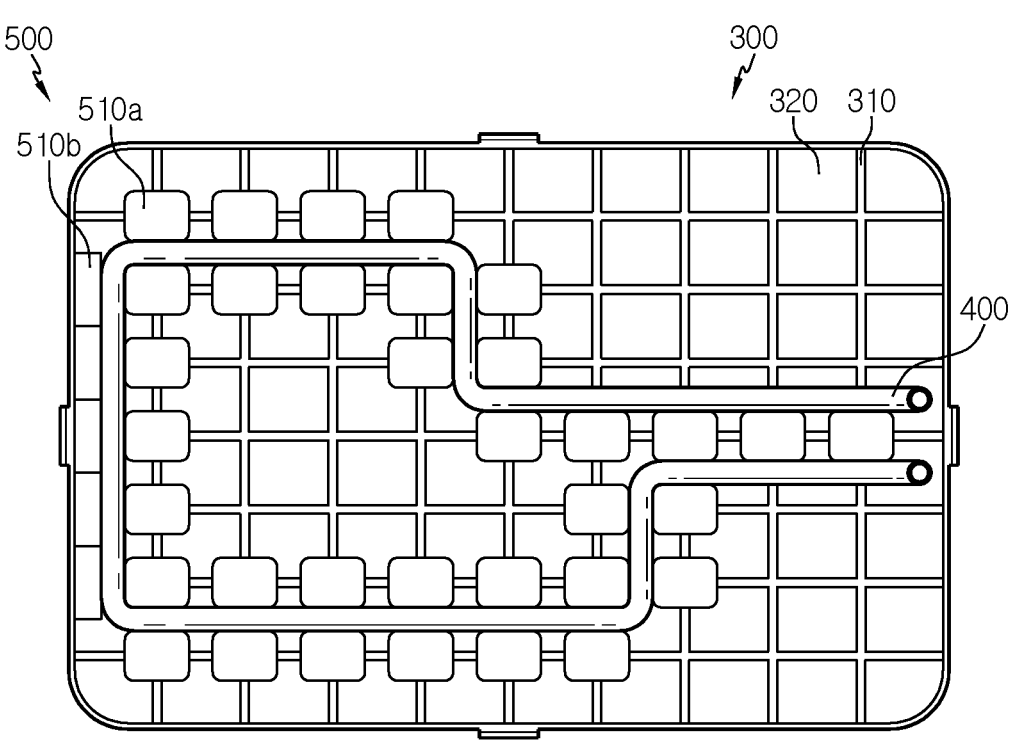
FIG. 5 is a top view of a cooling pipe disposed on the cover of FIG. 3, the cooling pipe having a different shape than the cooling pipe of FIG. 3.
Figure 6:
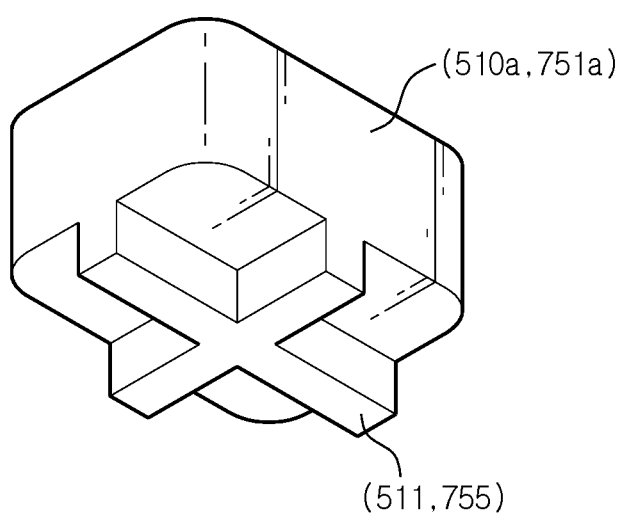
FIG. 6 is a perspective view of support blocks in the battery module of FIG. 1 having various shapes.
Figure 7:
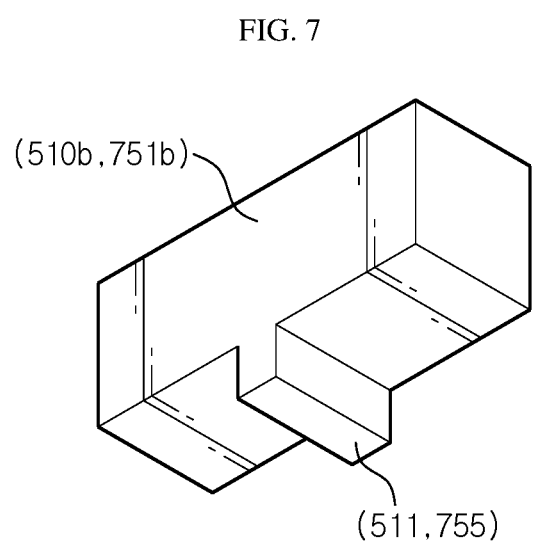

FIG. 1 is an overall perspective view of a battery module according to a first embodiment of the present disclosure, and FIG. 2 is an exploded perspective view of FIG. 1. FIG. 3 is a view illustrating a state in which a cooling pipe is disposed on a cover and supported by support blocks in the battery module according to a first embodiment of the present disclosure, and FIG. 4 is a view in which the cooling pipe in FIG. 3 is removed. FIG. 5 is a view illustrating a cooling pipe having a different shape compared to the cooling pipe of FIG. 3, and is disposed on the cover, and FIGS. 6 and 7 are perspective views of support blocks having various shapes in the battery module according to a first embodiment of the present disclosure.

Referring to the drawings, the battery module 10 according to the first embodiment of the present disclosure includes battery cells 100, a case 200, a cover 300, a cooling pipe 400, and a support structure 500.

Referring to FIGS. 1 and 2, the plurality of battery cells 100 are accommodated in the case 200 and protected. The battery cells 100 may vary in type. For example, the battery cell 100 may be provided as a pouch-type battery cell 100, or may be provided as a cylindrical battery cell 100.

The battery cell 100 includes an electrode lead, wherein the electrode lead provided in the battery cell 100 is a terminal connected to an external device, and may be made of a conductive material.

The electrode lead may include a positive electrode lead and a negative electrode lead. The positive electrode lead and the negative electrode lead may be disposed in opposite directions with respect to the longitudinal direction of the battery cell 100, or the positive electrode lead and the negative electrode lead may be disposed in the same direction with respect to the longitudinal direction of the battery cell 100.

The positive electrode lead and the negative electrode lead may be made of various materials. For example, the positive electrode lead may be made of an aluminum material, and the negative electrode lead may be made of a copper material.

The electrode lead may be electrically coupled to a bus bar. The battery cell 100 may have a structure in which a plurality of unit cells arranged in the order of positive electrode plate-separator-negative electrode plate or a plurality of bi-cells arranged in the order of positive electrode plate-separator-negative electrode plate-separator-positive electrode plate-separator-negative electrode plate are stacked according to the battery capacity.

The plurality of battery cells 100 may be accommodated in various ways within the case 200. For example, the plurality of battery cells 100 may be stacked on each other in the form of a stack of the battery cell 100. The battery cell 100 may have various structures, and the plurality of battery cells 100 may be stacked in various ways.

The stack of the battery cell 100 may include a plurality of cartridges (not shown) accommodating each battery cell 100. Each cartridge may be manufactured by injection molding of plastic, and the plurality of cartridges in which an accommodating portion capable of accommodating the battery cell 100 is formed may be stacked.

A connector element or a terminal element may be provided in a cartridge assembly in which the plurality of cartridges are stacked. The connector element may include, for example, various types of electrical connection parts or connection members to be connected to a battery management system (BMS) capable of providing data on at least the voltage or temperature of the battery cell 100.

The terminal element, as a main terminal connected to the battery cell 100, includes a positive electrode terminal and a negative electrode terminal.

Referring to FIGS. 1 and 2, the case 200 accommodates the plurality of battery cells 100. For example, the stack of the battery cell 100 or the cartridge assembly in which the stack of the battery cell 100 is accommodated are positioned within the case 200.

The case 200 may be provided in various ways, and for example, as shown in FIG. 2, may be configured to include an upper case 210 and a lower case 220. In alternative embodiments, the case 200 may be provided in various ways.

The case 200 may be provided to surround the stack of the battery cell 100 by the battery cells 100 or the cartridge assembly in which the stack of the battery cell 100 is accommodated. That is, the case 200 surrounds the entire battery cells 100, thereby protecting the battery cells 100 from external vibration or impact.

The case 200 may be formed in a shape corresponding to the shape of the battery cells 100, which may correspond to the stack of the battery cell 100 or the cartridge assembly. For example, when the stack of the battery cell 100 or the cartridge assembly is provided in a hexahedral shape, the case 200 may also be provided in a hexahedral shape.

The cover 300 is coupled to the case 200. Referring to FIGS. 1 and 2, the cover 300 may be coupled to a lower side of the case 200. In alternative embodiments, the coupling portion of the cover 300 may vary positions.

A plurality of receiving grooves 310 to which a plurality of support blocks 510 are coupled are formed in the cover 300. A detailed description of the plurality of receiving grooves 310 is described below.

The cooling pipe 400 is disposed between the case 200 and the cover 300 to cool the plurality of battery cells 100. The cooling pipe 400 is a flow path through which water or air moves, and may have various shapes depending on the arrangement of the plurality of battery cells 100.

The support structure 500 supports the cooling pipe 400. In addition, the support structure 500 is variably provided to correspond to various shapes of the cooling pipe 400. That is, when the heating portion changes according to the stacking method or arrangement of the plurality of battery cells 100, the shape of the cooling pipe 400 also changes accordingly. In addition, the support structure 500 is also changed to support the cooling pipe 400 which has a changed shape.

Because the battery module 10 according to a first embodiment of the present disclosure may support the cooling pipe 400 having various shapes through the variable support structure 500, manufacturing is eased and costs are lowered.

Referring to FIGS. 2 and 3, the support structure 500 includes a plurality of support blocks 510 in which protrusions 511 (such as the protrusions illustrated in FIGS. 6 and 7) are formed to be respectively coupled to the plurality of receiving grooves 310.

The support block 510 may have various shapes. For example, as shown in FIGS. 3 and 6, the support block 510*a* may be formed in a rectangular shape and disposed in the inner center of the cover 300 and in the vicinity of the center. A round protrusion or recess may be formed at a corner of the support block 510*a*.

Referring to FIGS. 3 and 7, the support block 510*b* may have a smaller size than the support block 510*a* and may be disposed on the edge of the cover 300.

The size and shape of the support block 510 are not limited to sizes and shapes shown in FIGS. 6 and 7, and may be vary.

A plurality of receiving grooves 310 are formed in the cover 300. There may be various ways in which the plurality of receiving grooves 310 are formed in the cover 300. For example, the cover 300 may be provided so that the receiving groove 310 is formed in an intaglio method.

Alternatively, as shown in FIG. 3, a plurality of embossed protrusions 320 may be formed on the cover 300, and the receiving grooves 310 may be formed between the plurality of protrusions 320.

The plurality of receiving grooves 310 may be arranged in a predetermined shape. For example, as shown in FIG. 3, the plurality of receiving grooves 310 may be arranged such that horizontal grooves and vertical grooves having the same spacing are orthogonal to each other. The arrangement of the plurality of receiving grooves 310 may vary in alternative embodiments.

Protrusions 511 may be formed in the plurality of support blocks 510 as shown in FIGS. 6 and 7, and the protrusions 511 may be respectively coupled to the plurality of receiving grooves 310. That is, a protrusion 511 having a shape corresponding to the shape of the receiving groove 310 is formed in each of the support blocks 510, and the protrusion 511 of the support block 510 is inserted into the receiving groove 310.

Referring to FIGS. 6 and 7, the protrusion 511 of the support block 510 may have various shapes. As shown in FIG. 6, the protrusion 511 in the shape of straight lines orthogonal to each other may be formed, or as shown in FIG. 7, protrusion 511 in the shape of a single straight line may be formed.

The shape of the protrusion 511 is not limited to the examples described herein, and various shapes of the protrusions 511 may be provided.

Referring to FIG. 4, the plurality of support blocks 510 are coupled to at least a portion of the plurality of receiving grooves 310 to form a flow path 600. Referring to FIG. 3, the cooling pipe 400 is inserted into the flow path 600.

When the cooling pipe 400 is inserted into the flow path 600, the plurality of support blocks 510 come into contact with the cooling pipe 400 to support the cooling pipe 400.

The flow path 600 may be variably provided according to the number and position of the plurality of support blocks 510*a*, 510*b* coupled to the plurality of receiving grooves 310, such that the shape of the flow path 600 may be changed with respect to the cooling pipe 400 having various shapes.

Also, the cooling pipe 400 may be inserted into the flow path 600 to be supported by the plurality of support blocks 510.

The cooling pipe 400 having a shape as shown in FIG. 3 may be supported by the plurality of support blocks 510, or the cooling pipe 400 having a deformed shape as shown in FIG. 5 may also be supported by the plurality of support blocks 510 whose arrangement is changed.

Hereinafter, the operation and effect of the battery module 10 according to the first embodiment of the present disclosure will be described with reference to the drawings.

The plurality of battery cells 100 included in the battery module 10 of the present disclosure may be disposed in the case 200 in various ways. The heating portion may be changed, and the shape of the cooling pipe 400 for cooling the heating portion may also be changed according to the change of the heating portion.

Additionally, as shown in FIGS. 3 and 5, when the shape of the cooling pipe 400 is changed, the support structure 500 for supporting the cooling pipe 400 may also be changed. In the case of the battery module 10 according to the first embodiment of the present disclosure, the support structure 500 is variably provided.

The support structure 500 includes the plurality of support blocks 510 having various shapes, and the plurality of support blocks 510 are coupled to the plurality of receiving grooves 310 to form the flow path 600 into which the cooling pipe 400 may be inserted.

Here, since the flow path 600 may have various shapes according to the number and position of the plurality of support blocks 510, the plurality of support blocks 510 may support the cooling pipe 400 having various shapes even if the shape of the cooling pipe 400 inserted into the flow path 600 has changed.

Figure 8:
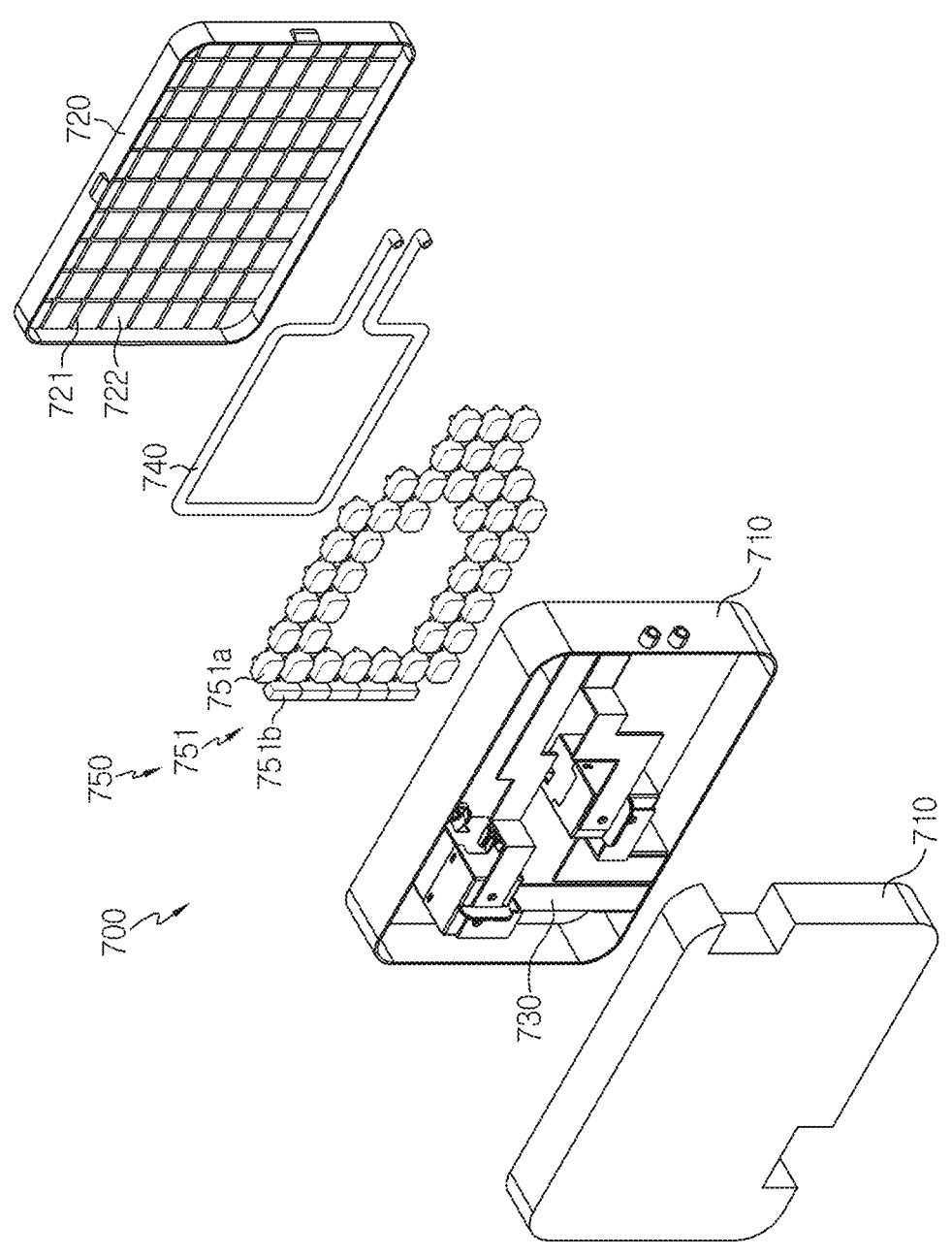
FIG. 8 is an exploded perspective view of an electrical member provided in the battery module according to another embodiment.

FIG. 8 is an exploded perspective view of an electrical member provided in the battery module according to a second embodiment of the present disclosure.

Hereinafter, the cooling of an electrical member 700 provided in the battery module 10 is described. Such cooling methods are similar to those described for cooling the battery cell 100 in a first embodiment described above, and thus each cooling feature will not be described again for sake of brevity.

Referring to FIG. 8, the electrical member 700 refers to a member provided with electrical equipment 730, such as a relay and a bus bar, and which generates heat when electrically charged. Therefore, the electrical member 700 needs cooling.

The description of the plurality of battery cells 100 and the case 200 in which the plurality of battery cells 100 are accommodated will be replaced with the description of the above-mentioned first embodiment. However, the structure for cooling the battery cells 100 in the second embodiment may be the same as in the structure in the first embodiment described above, or may be modified to cool the battery cells 100 in a different manner.

The electrical member 700 is coupled to various portions of the case 200. For example, as shown in FIG. 1, the electrical member 700 may be coupled to the outer side of the case 200. Additionally, the electrical member 700 may be coupled to the inside of the case 200.

The electrical member 700 may be configured to include an electrical case 710 and an electrical cover 720. Various pieces of electrical equipment 730 are accommodated in the electrical case 710, thereby protecting the electrical equipment 730 from external impact. The electrical cover 720 is coupled to the electrical case 710.

A plurality of receiving grooves 721 to which a plurality of support blocks 751 are coupled are formed in the electrical cover 720. A detailed description of the plurality of receiving grooves 721 is described below.

The cooling pipe 740 is disposed in the electrical member 700 to cool the electrical member 700. For example, the cooling pipe 740 may be disposed between the electrical case 710 and the electrical cover 720 of the electrical member 700 to cool the electrical equipment 730 provided in the electrical member 700.

The cooling pipe 740 of the second embodiment is different from the battery cell 100 of the first embodiment in that the electrical member 700 is cooled.

As the cooling pipe 400 in the first embodiment has various shapes according to the various arrangement of the plurality of battery cells 100, so may the cooling pipe 740 in the second embodiment have various shapes according to the arrangement of the electrical equipment 730 provided in the electrical member 700.

In the first embodiment, the cooling pipe 400 cools the plurality of battery cells 100, and in the second embodiment, the cooling pipe 740 cools the electrical equipment 730 provided in the electrical member 700. In this respect, there is a difference in the object of cooling, but other basic configurations are similar.

The support structure 750 supports the cooling pipe 740 and may vary to correspond to the shape of the cooling pipe 740. The support structure 750 in the second embodiment is similar to the support structure 500 in the first embodiment.

The support structure 750 includes a plurality of support blocks 751 in which protrusions 755 (illustrated in FIGS. 6 and 7) are formed to be respectively coupled to the plurality of receiving grooves 721. The detailed description of the plurality of receiving grooves 721 and the plurality of support blocks 751, for example, the support block 751a and the support block 751b, and the protrusion 755 is similar to that of the support block 510a and the support block 510b, and the protrusion 511 in the first embodiment, and thus, will be replaced with the description of the first embodiment.

The plurality of support blocks 751 and the plurality of receiving grooves 721 are coupled to form a flow path 760, and the cooling pipe 740 is inserted into the flow path 760. The plurality of support blocks 751 contact the cooling pipe 740 to support the cooling pipe 740, and in this configuration in which the flow path 760 is variably provided according to the number and position of the plurality of support blocks 751, is similar to the first embodiment.

A battery pack (not shown) according to an embodiment of the present disclosure may include one or more battery modules 10 according to an embodiment of the present disclosure as described above. Also, the battery pack may further include a housing for accommodating the battery module 10, various devices for controlling charge/discharge of the battery module 10, such as a BMS, a current sensor, a fuse, and the like, in addition to the battery module 10.

A vehicle (not shown) according to an embodiment of the present disclosure may include the above-described battery module 10 or the battery pack, and the battery pack may include the battery module 10. In addition, the battery module 10 according to an embodiment of the present disclosure may be applied to the vehicle, for example, a predetermined vehicle configured to use electricity, such as an electric vehicle or a hybrid vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module comprising:
   a plurality of battery cells;
   a case configured to accommodate the plurality of battery cells;
   a cover coupled to the case;

a cooling pipe disposed between the case and the cover to cool the plurality of battery cells; and a support structure configured to support the cooling pipe and to correspond to a shape of the cooling pipe, wherein the cover includes a plurality of receiving grooves, and wherein the support structure includes a plurality of support blocks, each support block of the plurality of support blocks having at least one protrusion configured to couple within a receiving groove of the plurality of receiving grooves.

2. The battery module according to claim 1, wherein the plurality of receiving grooves are arranged in a predetermined shape, the plurality of support blocks are coupled to at least a portion of the plurality of receiving grooves to form a flow path, and the cooling pipe is configured to be inserted into the flow path.

3. The battery module according to claim 2, wherein the plurality of support blocks contact the cooling pipe to support the cooling pipe when the cooling pipe is inserted into the flow path.

4. The battery module according to claim 3, wherein the flow path varies according to a number and position of the plurality of support blocks coupled to the plurality of receiving grooves.

5. A battery module comprising:

a plurality of battery cells;

a case configured to accommodate the plurality of battery cells;

an electrical member coupled to the case;

a cooling pipe disposed in the electrical member to cool the electrical member; and a support structure configured to support the cooling pipe and correspond to a shape of the cooling pipe, wherein the electrical member includes:

an electrical case configured to accommodate electrical equipment; and an electrical cover coupled to the electrical case, wherein the cooling pipe is disposed between the electrical case and the electrical cover to cool the electrical equipment.

6. The battery module according to claim 5, wherein a plurality of receiving grooves are formed in the electrical cover, the support structure further comprising a plurality of support blocks including protrusions, the protrusions configured to be respectively coupled to the plurality of receiving grooves.

7. The battery module according to claim 6, wherein the plurality of receiving grooves are arranged in a predetermined shape, the plurality of support blocks are coupled to at least a portion of the plurality of receiving grooves to form a flow path, and the cooling pipe is configured to be positioned within the flow path.

8. The battery module according to claim 7, wherein the plurality of support blocks contact the cooling pipe to support the cooling pipe when the cooling pipe is positioned within the flow path.

9. The battery module according to claim 8, wherein the flow path varies according to a number and position of the plurality of support blocks coupled to the plurality of receiving grooves.

10. A battery pack comprising the battery module according to claim 1.

11. A vehicle comprising the battery module according to claim 1.

* * * * *